(12) United States Patent
Wada

(10) Patent No.: US 10,788,644 B2
(45) Date of Patent: Sep. 29, 2020

(54) LENS DEVICE, IMAGING DEVICE, AND FOCUS SHIFT CORRECTION METHOD OF LENS DEVICE

(71) Applicant: FUJIFILM Corporation, Tokyo (JP)

(72) Inventor: Tetsu Wada, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 67 days.

(21) Appl. No.: 16/285,227

(22) Filed: Feb. 26, 2019

(65) Prior Publication Data
US 2019/0187403 A1 Jun. 20, 2019

Related U.S. Application Data

(63) Continuation of application No. PCT/JP2017/017097, filed on Apr. 28, 2017.

(30) Foreign Application Priority Data

Sep. 2, 2016 (JP) ................. 2016-171618

(51) Int. Cl.
*G02B 7/04* (2006.01)
*G02B 7/02* (2006.01)
(Continued)

(52) U.S. Cl.
CPC .............. *G02B 7/028* (2013.01); *G03B 1/00* (2013.01); *H04N 3/00* (2013.01)

(58) Field of Classification Search
CPC ...................................................... G02B 7/028
See application file for complete search history.

(56) References Cited

U.S. PATENT DOCUMENTS

2005/0063694 A1* 3/2005 Nakazawa ............. G02B 7/282
396/97

FOREIGN PATENT DOCUMENTS

JP H05103255 4/1993
JP H09222544 8/1997
(Continued)

OTHER PUBLICATIONS

"International Preliminary Report on Patentability (Form PCT/IPEA/409) of PCT/JP2017/017097," completed on Dec. 27, 2017, with English translation thereof, pp. 1-6.
(Continued)

*Primary Examiner* — Joseph P Martinez
(74) *Attorney, Agent, or Firm* — JCIPRNET

(57) ABSTRACT

Provided are a lens device capable of preventing a focus shift of an imaging optical system due to heat without reducing a degree of freedom of design, an imaging device comprising the same, and a focus shift correction method of a lens device. A lens device 100 includes an imaging optical system 20 that includes a plurality of lenses, a lens barrel 10 that accommodates the imaging optical system 20, a temperature sensor 30 that is provided outside the lens barrel 10 to detect a temperature of the lens barrel 10, a temperature sensor 50 that is provided outside the lens barrel 10 to detect a temperature of a member 40 of which a temperature characteristic indicating a temperature change with a time change is different from a temperature characteristic of the lens barrel 10, and a focus correction unit 60 that corrects a focus shift of the imaging optical system 20 by controlling a relay lens 25 as a correction lens included in the imaging optical system 20 based on temperature information items respectively detected by the temperature sensor 30 and the temperature sensor 50.

17 Claims, 6 Drawing Sheets

(51) Int. Cl.
*H04N 3/00* (2006.01)
*G03B 1/00* (2006.01)

(56) References Cited

FOREIGN PATENT DOCUMENTS

| | | |
|---|---|---|
| JP | 2002341243 | 11/2002 |
| JP | 2003247889 | 9/2003 |
| JP | 2005091808 | 4/2005 |
| JP | 2011053512 | 3/2011 |

OTHER PUBLICATIONS

"International Search Report (Form PCT/ISA/210) of PCT/JP2017/017097," dated Aug. 1, 2017, with English translation thereof, pp. 1-5.

* cited by examiner

| DIFFERENCE VALUE BETWEEN LENS BARREL TEMPERATURE AND MEMBER TEMPERATURE | RELATIVE TEMPERATURE OF SPECIFIC LENS |
|---|---|
| ***1 | ++++1 |
| ***2 | ++++2 |
| ***3 | ++++3 |
| ***4 | ++++4 |
| . | . |
| . | . |
| . | . |
| . | . |

FIG. 4

| TEMPERATURE OF SPECIFIC LENS | MOVEMENT AMOUNT OF CORRECTION LENS |
|---|---|
| bbbb1 | aaaa1 |
| bbbb2 | aaaa2 |
| bbbb3 | aaaa3 |
| bbbb4 | aaaa4 |
| . | . |
| . | . |
| . | . |
| . | . |
| | |

| DIFFERENCE VALUE BETWEEN LENS BARREL TEMPERATURE AND AIR TEMPERATURE | RELATIVE TEMPERATURE OF SPECIFIC LENS |
|---|---|
| ****1 | ++++1 |
| ****2 | ++++2 |
| ****3 | ++++3 |
| ****4 | ++++4 |
| . | . |
| . | . |
| . | . |
| . | . |
| | |

LENS DEVICE, IMAGING DEVICE, AND FOCUS SHIFT CORRECTION METHOD OF LENS DEVICE

CROSS REFERENCE TO RELATED APPLICATION

This is a continuation of International Application No. PCT/JP2017/017097 filed on Apr. 28, 2017, and claims priority from Japanese Patent Application No. 2016-171618 filed on Sep. 2, 2016, the entire disclosures of which are incorporated herein by reference.

BACKGROUND OF THE INVENTION

1. Field of the Invention

The present invention relates to a lens device, an imaging device, and a focus shift correction method of a lens device.

2. Description of the Related Art

For example, a television camera is configured such that a lens device is connected to a camera main body. An imaging optical system included in this lens device includes a plurality of lenses. The plurality of lenses is built in within a lens barrel so as to have a predetermined positional relationship, and is supported by a lens support member within the lens barrel.

There are some cases where a lens which causes a focus shift of the imaging optical system due to expansion or contraction caused by the influence of heat is present among the plurality of lenses accommodated in the lens barrel. A technology for preventing a captured image quality caused by such a focus shift from deteriorating is described in JP1993-103255A (JP-H05-103255A) and JP2002-341243A.

JP1993-103255A (JP-H05-103255A) describes a lens device including temperature sensors inside and outside a lens barrel. This lens device corrects a focus shift of an imaging optical system caused by the influence of heat based on temperature information items detected by two temperature sensors inside and outside the lens barrel.

JP2002-341243A describes a lens device to which a temperature sensor is attached to a lens within a lens barrel. This lens device corrects the focus shift caused by the influence of heat based on temperature information item of the lens detected by the temperature sensor.

JP2003-247889A describes an imaging device which is not a technology for correcting the focus shift of the imaging optical system caused by the influence of heat, and comprises an infrared optical system, a temperature sensor attached to the infrared optical system, a casing that accommodates an imaging element which images a subject through the infrared optical system, and a temperature sensor attached to an outer peripheral surface of the casing. This imaging device performs calibration of the imaging element based on temperature information items detected by these two temperature sensors.

SUMMARY OF THE INVENTION

There are many cases where a lens which is likely to cause the focus shift is supported so as to be movable in an optical axis direction within the lens barrel like a focus lens. In such a configuration in which the temperature sensor is directly attached to the movable lens as in JP2002-341243A, it is necessary to devise the arrangement of the temperature sensor or the routing of the wiring of the temperature sensor in order to secure an optical characteristic of the imaging optical system, and a degree of freedom of design of the lens device decreases.

Even in such a configuration in which the temperature sensor is not directly attached to the lens within the lens barrel as in JP1993-103255A (JP-H05-103255A), it is necessary to devise the arrangement of the temperature sensor and the routing of the wiring of the temperature sensor without influencing the optical characteristic of the imaging optical system in order to provide the temperature sensor within the lens barrel having no much space, and a degree of freedom of design of the lens device decreases.

JP2003-247889A does not assume that the optical characteristic of the imaging optical system is corrected. Since the temperature sensor is directly attached to the infrared optical system, the degree of freedom of design of the imaging device is low.

The present invention has been made in view of such circumstances, and an object of the present invention is to provide a lens device capable of preventing a focus shift of an imaging optical system due to heat without reducing a degree of freedom of design, an imaging device comprising the same, and a focus shift correction method of a lens device.

A lens device of the present invention comprises an imaging optical system that includes a plurality of lenses, a lens barrel that accommodates the imaging optical system, a first temperature sensor that is provided outside the lens barrel to detect a temperature of the lens barrel, a second temperature sensor that is provided outside the lens barrel to detect a temperature of a target of which a temperature characteristic indicating a temperature change with a time change is different from a temperature characteristic of the lens barrel, and a focus correction unit that corrects a focus shift of the imaging optical system by controlling a correction lens included in the plurality of lenses based on temperature information items respectively detected by the first temperature sensor and the second temperature sensor.

An imaging device of the present invention comprises the lens device, and an imaging element that images a subject through the imaging optical system.

A focus shift correction method of a lens device of the present invention is a focus shift correction method of a lens device that includes an imaging optical system including a plurality of lenses, and a lens barrel which accommodates the imaging optical system. The method comprises a focus correction step of correcting a focus shift of the imaging optical system by controlling a correction lens included in the plurality of lenses based on temperature information items respectively detected by a first temperature sensor which is provided outside the lens barrel to detect a temperature of the lens barrel and a second temperature sensor which is provided outside the lens barrel to detect a temperature of a target of which a temperature characteristic indicating a temperature change with a time change is different from a temperature characteristic of the lens barrel.

According to the present invention, it is possible to provide a lens device capable of preventing a focus shift of an imaging optical system due to heat without reducing a degree of freedom of design, an imaging device comprising the same, and a focus shift correction method of a lens device.

BRIEF DESCRIPTION OF THE DRAWINGS

FIG. 4 is a diagram showing an example of second data stored in the storage medium 70 of the lens device 100 shown in FIG. 1.

DESCRIPTION OF THE PREFERRED EMBODIMENTS

Figure 1:
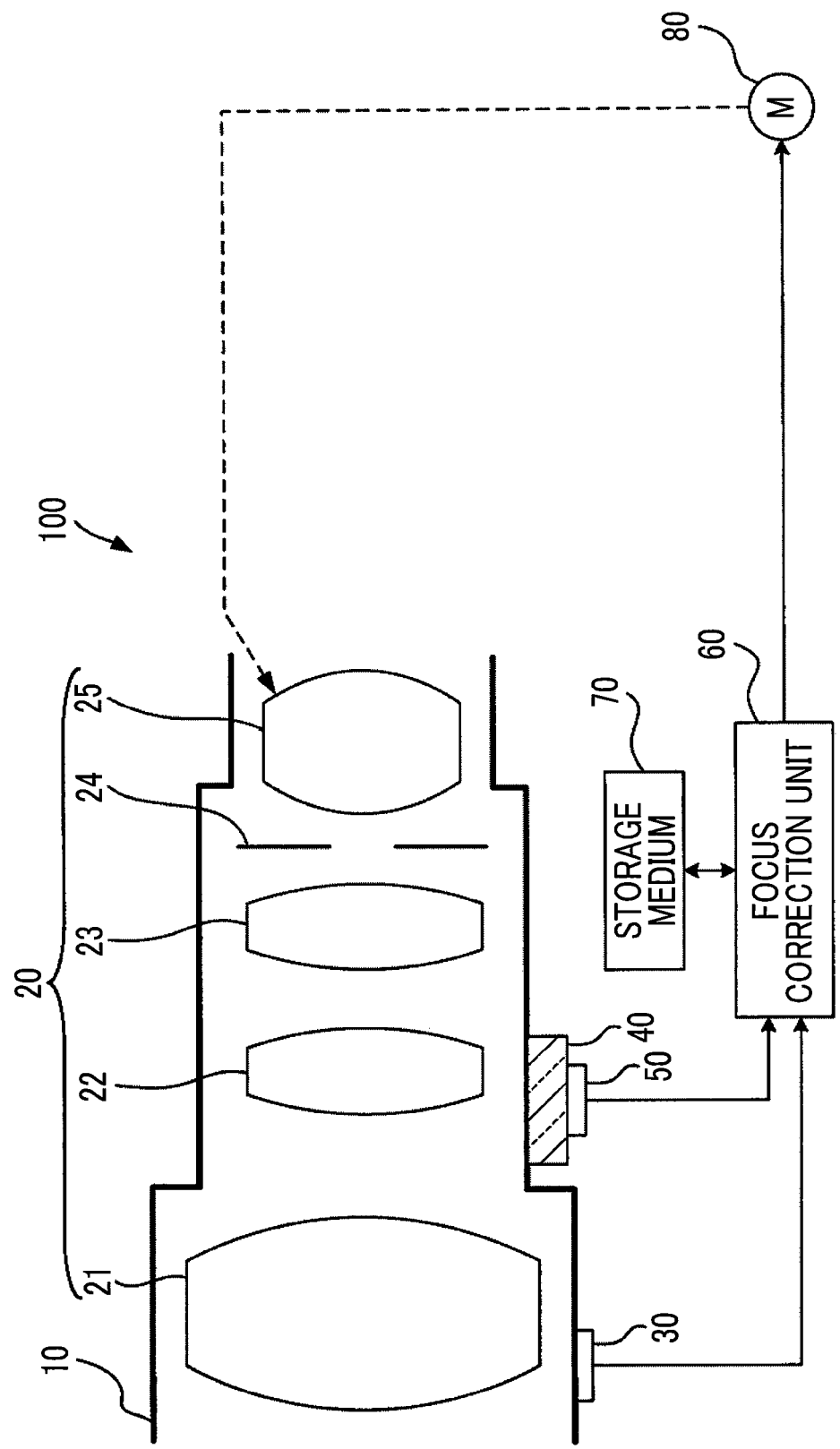
FIG. 1 is a schematic diagram showing a schematic configuration of a lens device 100 which is an embodiment of the present invention.

FIG. 1 is a schematic diagram showing a schematic configuration of a lens device 100 which is an embodiment of the present invention.

The lens device 100 comprises an imaging optical system 20, a lens barrel 10 which is made of metal such as aluminum or titanium and accommodates the imaging optical system 20, a temperature sensor 30 fixed onto an outer peripheral surface of the lens barrel 10, a member 40 which is fixed onto the outer peripheral surface of the lens barrel 10 and has a temperature characteristic different from that of the lens barrel 10, a temperature sensor 50 fixed onto the member 40, a focus correction unit 60, a storage medium 70, and a motor 80.

The lens device 100 is used while the lens barrel 10 is attached to the imaging device on which an imaging element (not shown) is mounted. In the imaging device to which the lens barrel 10 is attached, it is possible to obtain a captured image by imaging a subject by using the imaging element through the imaging optical system 20 and performing image processing on captured image signals output from the imaging element.

The imaging optical system 20 comprises a plurality of lenses for forming a subject image on the imaging element of the imaging device, and a stop 24.

In the example of FIG. 1, the imaging optical system 20 comprises, as a plurality of lenses, a focusing lens 21 which is supported by the lens barrel 10 so as to be movable in an optical axis direction for focusing on the subject, a variator lens 22 which is supported by the lens barrel 10 so as to be movable in the optical axis direction in order to change a focal length, a compensator lens 23 which is supported by the lens barrel 10 so as to be movable in the optical axis direction and moves in the optical axis direction in synchronization with the variator lens 22 to correct a shift in focus caused by a change in focal length, and a relay lens 25 which is supported by the lens barrel 10 so as to be movable in the optical axis direction.

The focusing lens 21, the variator lens 22, the compensator lens 23, and the relay lens 25 are composed of one or a plurality of lenses.

The positions of the focusing lens 21, the variator lens 22, the compensator lens 23, and the relay lens 25 inside the lens barrel 10 are adjusted in a state of a predetermined reference temperature.

A specific lens which is a lens of which an optical characteristic changes to such an extent that imaging quality is not allowable due to the expansion or contraction of the lens in a case where a temperature becomes higher or lower than a reference value is included in the focusing lens 21, the variator lens 22, and the compensator lens 23. The relay lens 25 is a correction lens for correcting a shift in focus (a shift in position of the subject image formed by the imaging optical system 20 in the optical axis direction) of the imaging optical system 20 caused by such a change in optical characteristic of the specific lens.

The motor 80 drives the relay lens 25 based on a command of the focus correction unit 60 to control a position of the relay lens 25 in the optical axis direction.

The temperature sensor 30 is a first temperature sensor that uses a temperature of the lens barrel 10 as a detecting target. A contact type using a thermocouple, a platinum resistance temperature detector, and a thermistor temperature detector, or a noncontact type for measuring a temperature by measuring infrared rays emitted from an object is used as the temperature sensor 30.

The member 40 is a member of which a temperature characteristic approximates the temperature characteristic of the specific lens included in the imaging optical system 20, and is made of, for example, glass or plastic. A temperature characteristic of a certain object refers to a temperature change with respect to a time change of this object. A case where the member has the temperature characteristic which approximates the temperature characteristic of the specific lens included in the imaging optical system includes a case where a difference between two temperature characteristics is included in a tolerance range in addition to a case where these two temperature characteristics are completely equal to each other.

The temperature characteristic of the object is determined by the mass and specific heat of the object. Thus, it is preferable that a member having a mass approximately equal to a mass of the specific lens and a specific heat approximately equal to a specific heat of the specific lens is used as the member 40. A case where two masses (or specific heats) are approximately equal to each other includes a case where a difference between these two masses (or specific heats) is included in a tolerance range in addition to a case where these two masses (or specific heats) are completely equal to each other.

The specific lens may be one lens, or may be a plurality of lenses.

For example, in a case where the specific lens is a plurality of lenses made of a material having an approximately equal specific heat, a member having a mass approximately equal to the total mass of the plurality of specific lenses and a specific heat approximately equal to the specific heat of the plurality of lenses is used as the member 40.

In a case where the plurality of specific lenses is present, a temperature characteristic obtained by performing unweighted average or weighted average of temperature characteristics of the plurality of lenses may be used as the temperature characteristic of the specific lens. Alternatively, a temperature characteristic of the lens, among the plurality of lenses, of which a change in optical characteristic caused by the temperature change is maximum may be used as the temperature characteristic of the specific lens.

Although the member 40 is fixed onto the outer peripheral surface of the lens barrel 10 by coming in contact with the outer peripheral surface thereof in the example of FIG. 1, the present invention is not limited thereto. The member may be disposed in any portion outside the lens barrel 10.

The temperature sensor 50 is a second temperature sensor that uses a temperature of the member 40 as a detecting target. A contact type using a thermocouple, a platinum resistance temperature detector, and a thermistor temperature detector, or a noncontact type for measuring a temperature by measuring infrared rays emitted from an object is used as the temperature sensor 50.

The storage medium 70 is constituted by a nonvolatile memory such as a flash memory. Focus shift correcting data including first data obtained by associating a difference value between two temperature information items to be respectively detected by the temperature sensor 30 and the temperature sensor 50 with a relative value of temperature information of the specific lens in a case where any one of these two temperature information items is used as a reference is stored in the storage medium 70 in advance.

Figures 2, 3:
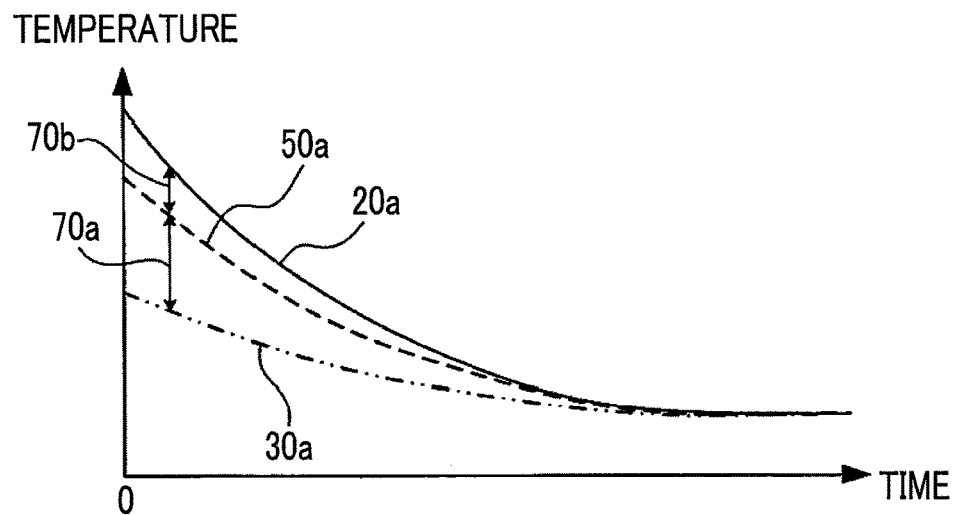
FIG. 2 is a diagram showing an example of the temperature characteristics of a lens barrel 10, a member 40, and a specific lens of the lens device 100 shown in FIG. 1.
FIG. 3 is a diagram showing an example of first data stored in a storage medium 70 of the lens device 100 shown in FIG. 1.

FIG. 2 is a diagram showing an example of the temperature characteristics of the lens barrel 10, the member 40, and the specific lens of the lens device 100 shown in FIG. 1. In FIG. 2, a lateral axis depicts an elapsed time, and a vertical axis depicts a temperature.

A curved line 30a shown in FIG. 2 represents a temperature characteristic of the lens barrel 10, and is obtained by measuring the temperature by using the temperature sensor 30. A curved line 50a shown in FIG. 2 represents a temperature characteristic of the member 40, and is obtained by measuring the temperature by using the temperature sensor 50. A curved line 20a shown in FIG. 2 represents a temperature characteristic of the specific lens included in the imaging optical system 20, and is obtained by measuring the temperature by using a temperature sensor directly attached to the specific lens.

The temperature characteristic of the specific lens and the temperature characteristic of the member 40 are approximately equal to each other. However, the specific lens is disposed inside the lens barrel 10, and the member 40 is disposed outside the lens barrel 10. Since changes in temperature in areas inside and outside the lens barrel 10 due to an elapsed time are different, the curved line 50a and the curved line 20a are slightly shifted.

The focus shift correcting data stored in the storage medium 70 includes first data illustrated in FIG. 3 and second data illustrated in FIG. 4.

The first data is data obtained by associating a difference value (a reference 70a of FIG. 2) between the temperature information items of the lens barrel 10 and the member 40 in a certain time with a relative value (a reference 70b of FIG. 2) of the temperature information of the specific lens with respective to the temperature information of the member 40 in a certain time.

The first data may be data obtained by associating the difference value (the reference 70a of FIG. 2) between the temperature information items of the lens barrel 10 and the member 40 in the certain time with a relative value (a value obtained by combining the reference 70a with the reference 70b of FIG. 2) of the temperature information of the specific lens with respective to the temperature information of the lens barrel 10 in a certain time.

The second data is data obtained by associating the temperature information of the specific lens included in the imaging optical system 20 with a movement amount of the relay lens 25 which is the correction lens.

For example, as for the movement amount of the relay lens 25, the movement amount in a direction in which the relay lens approaches the subject is expressed by a plus value, and the movement amount in a direction in which the relay lens is away from the subject is expressed by a minus value. The value of the movement amount of the relay lens 25 is "zero (0)" in a case where the temperature of the specific lens is the reference temperature.

The lens device 100 includes a system controller which includes various processors, a random access memory (RAM), and a read only memory (ROM). The processor executes a program stored in the ROM, and thus the lens device functions as the focus correction unit 60.

The various processors include a central processing unit (CPU) which is a general-purpose processor that performs various processing, a programmable logic device (PLD) which is a processor capable of changing a circuit configuration after a field-programmable gate array (FPGA) is manufactured, and a dedicated electric circuit which is a processor having a dedicated circuit configuration designed for performing a specific process such as an Application-Specific Integrated Circuit (ASIC).

More specifically, the structures of the various processors are electric circuits obtained by combining circuit elements such as semiconductor devices.

The system controller may be constituted by one of the various processors, or may be constituted by a combination (for example, a combination of a plurality of FPGAs or a combination of the CPU and the FPGA) of two or more processors of the same type or different types.

The focus correction unit 60 estimates the temperature information of the specific lens included in the imaging optical system 20 based on the temperature information of the lens barrel 10 detected by the temperature sensor 30, the temperature information of the member 40 detected by the temperature sensor 50, and the first data stored in the storage medium 70.

The focus correction unit 60 corrects the focus shift by determining the movement amount of the relay lens 25 corresponding to the temperature information based on the estimated temperature information and the second data stored in the storage medium 70, controlling the motor 80 according to the determined movement amount, and moving the relay lens 25 by the movement amount.

An operation of the lens device 100 having the aforementioned configuration will be described.

In a state in which the lens device 100 is powered on, the temperature information of the lens barrel 10 is detected by the temperature sensor 30, the temperature information of the member 40 is detected by the temperature sensor 50, and the detected temperature information items are input to the focus correction unit 60.

The focus correction unit 60 temporarily stores the temperature information of the lens barrel 10 input from the temperature sensor 30 and the temperature information of the member 40 input from the temperature sensor 50 in the RAM, and calculates a difference value (an absolute value without regard to its sign) between these two temperature information items.

Subsequently, the focus correction unit 60 calculates an estimation value of the temperature information of the specific lens by reading out the relative value of the temperature information of the specific lens corresponding to the calculated difference value from the first data stored in the storage medium 70 and adding the readout relative value to the temperature information of the member 40 stored in the RAM.

In a case where the first data stored in the storage medium 70 is the data obtained by associating the difference value between the temperature information of the lens barrel 10 and the temperature information of the member 40 with the relative value of the temperature information of the specific lens with respect to the lens barrel 10, the focus correction unit 60 calculates the estimation value of the temperature information of the specific lens by adding the readout relative value to the temperature information of the lens barrel 10 stored in the RAM.

Subsequently, the focus correction unit 60 reads out the movement amount of the relay lens 25 corresponding to the calculated estimation value from the second data stored in the storage medium 70, controls the motor 80 based on the readout movement amount, and moves the relay lens 25 in the optical axis direction by the movement amount.

The aforementioned processes are repeatedly performed during the activation of the lens device 100. Accordingly, the focus shift of the imaging optical system 20 caused by the temperature change of the specific lens is prevented.

As mentioned above, according to the lens device 100, it is possible to correct the focus shift of the imaging optical system 20 by controlling the position of the relay lens 25 in the optical axis direction based on the temperature information items respectively detected by the temperature sensor 30 and the temperature sensor 50 provided outside the lens barrel 10. Thus, it is not necessary to provide the temperature sensor within the lens barrel 10, and thus, it is possible to eliminate a concern about due to stray light caused by the temperature sensor attached to the specific lens and light shielding due to the member related to the temperature sensor as compared to a case where the temperature sensor is directly attached to the specific lens, for example. A mechanism for moving the temperature sensor together with the specific lens is not required, and thus, it is possible to improve a degree of freedom of design within the lens barrel 10. As a result, it is possible to reduce the manufacturing cost of the lens device 100.

In a case where the lens device 100 is a lens device for broadcasting, the lens barrel 10 becomes large, and a difference between the temperatures inside and outside the lens barrel 10 becomes large. Thus, it is difficult to improve the correction accuracy of the focus shift by merely correcting the focus shift based on only the temperature of the lens barrel 10 or correcting the focus shift based on only the temperature inside the lens barrel 10. In contrast, according to the present embodiment, since the temperature of the specific lens is estimated based on the information items of the two temperature sensors such as the temperature sensor 30 and the temperature sensor 50, it is possible to correct the focus shift with high accuracy.

According to the lens device 100, the member 40 of which the temperature characteristic approximates the temperature characteristic of the specific lens included in the imaging optical system 20 is as the detecting target of the temperature sensor 50. Thus, it is possible to improve the estimation accuracy of the temperature information of the specific lens calculated based on the first data stored in the storage medium 70 and the difference value of the temperature information items respectively detected by the temperature sensor 30 and the temperature sensor 50, and it is possible to correct the focus shift with high accuracy.

Figure 5:
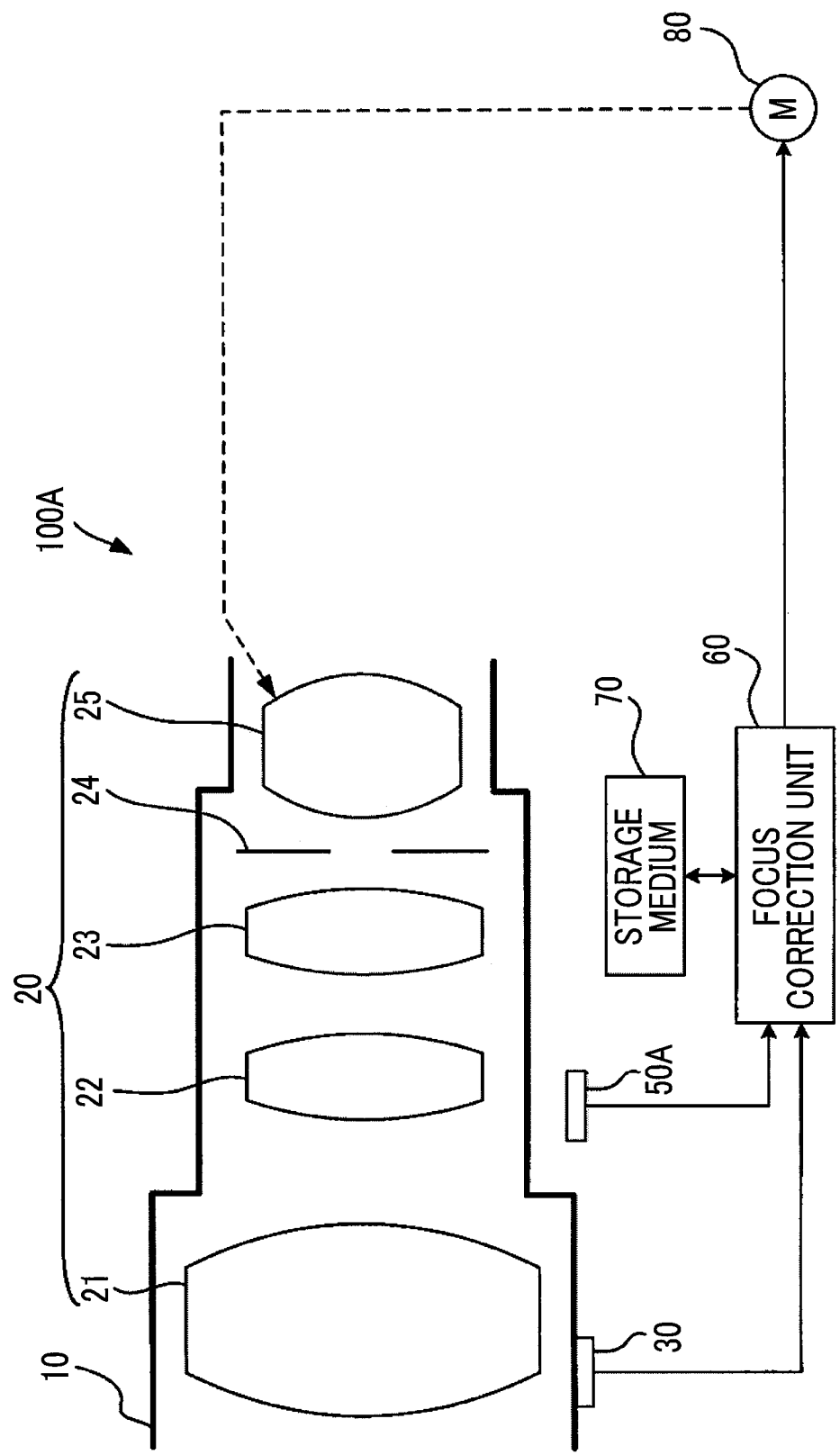
FIG. 5 is a schematic diagram showing a schematic configuration of a lens device 100A which is a modification example of the lens device 100 shown in FIG. 1.

FIG. 5 is a schematic diagram showing a schematic configuration of a lens device 100A which is a modification example of the lens device 100 shown in FIG. 1. In FIG. 5, the same components as those of FIG. 1 will be assigned the same references.

The lens device 100A has the same configuration as the configuration of the lens device 100 except that the member 40 is removed and the temperature sensor 50 is replaced with a temperature sensor 50A.

The temperature sensor 50A is a second temperature sensor that uses an atmosphere of a portion in which the lens device 100 is present as a detecting target. The atmosphere has a temperature characteristic different from the temperature characteristic of the specific lens included in the imaging optical system.

A ventilation tube capable of introducing or discharging an ambient air is attached to the lens barrel 10, and the temperature sensor 50A is provided within this ventilation tube. The temperature information detected by the temperature sensor 50A is input to the focus correction unit 60.

Figures 6, 7:
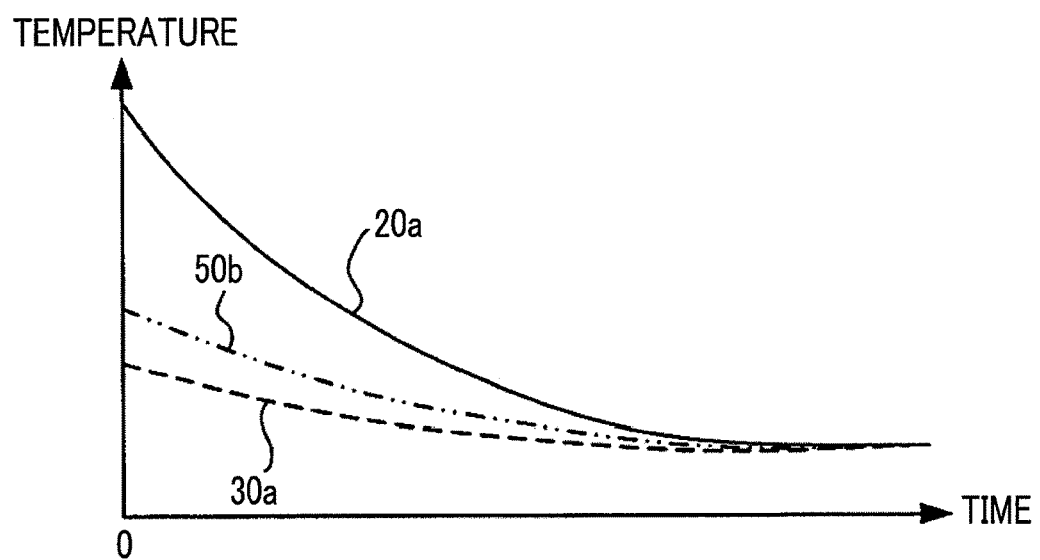
FIG. 6 is a diagram showing an example of a temperature of a lens barrel 10 of the lens device 100A shown in FIG. 5, a temperature of a specific lens included in an imaging optical system 20, and a temperature characteristic of an atmosphere of a portion in which the lens device 100A is present.
FIG. 7 is a diagram showing an example of first data stored in a storage medium 70 of the lens device 100A shown in FIG. 5.

FIG. 6 is a diagram showing an example of the temperature of the lens barrel 10 of the lens device 100A shown in FIG. 5, the temperature of the specific lens included in the imaging optical system 20, and the temperature characteristic of the atmosphere of the portion in which the lens device 100A is present. In FIG. 6, a lateral axis depicts an elapsed time, and a vertical axis depicts a temperature. A curved line 50b shown in FIG. 6 represents a change in temperature (air temperature) of the atmosphere of the portion in which the lens device 100A is present, and is obtained by measuring the temperature by using the temperature sensor 50A.

As shown in FIG. 6, a correspondence between a difference value between the temperature of the lens barrel 10 and the air temperature and the temperature of the specific lens can be obtained from the lens device 100A through the measurement.

As illustrated in FIG. 7, the first data stored in the storage medium 70 of the lens device 100A is data obtained by associating the difference value between two temperature information items respectively detected by the temperature sensor 30 and the temperature sensor 50A with the relative value of the temperature information of the specific lens in a case where any one of the two temperature information items is used as a reference. The second data stored in the storage medium 70 of the lens device 100A is the same as the data stored in the storage medium 70 of the lens device 100.

An operation of the lens device 100A having the aforementioned configuration will be described.

In a state in which the lens device 100A is powered on, the temperature information of the lens barrel 10 is detected by the temperature sensor 30, the temperature information of the atmosphere is detected by the temperature sensor 50A, and the temperature information items are input to the focus correction unit 60.

The focus correction unit 60 temporarily stores the temperature information of the lens barrel 10 input from the temperature sensor 30 and the temperature information of the atmosphere input from the temperature sensor 50A in the RAM, and calculates the difference value (the absolute value without regard to its sign) between these two temperature information items.

Subsequently, the focus correction unit 60 calculates the estimation value of the temperature information of the specific lens by reading out the relative value of the temperature information of the specific lens corresponding to the calculated difference value from the first data stored in the storage medium 70 and adding the readout relative value to the temperature information of the atmosphere stored in the RAM.

In a case where the first data stored in the storage medium 70 is the data obtained by associating the difference value between the temperature information of the lens barrel 10 and the temperature information of the atmosphere with the relative value of the temperature information of the specific lens with respect to the lens barrel 10, the focus correction unit 60 calculates the estimation value of the temperature information of the specific lens by adding the relative value readout in this manner to the temperature information of the lens barrel 10 stored in the RAM.

Subsequently, the focus correction unit 60 reads out the movement amount of the relay lens 25 corresponding to the calculated estimation value from the second data stored in the storage medium 70, controls the motor 80 based on the readout movement amount, and moves the relay lens 25 in the optical axis direction by the movement amount.

The aforementioned processes are repeatedly performed during the activation of the lens device 100A. Accordingly, the focus shift of the imaging optical system 20 caused by the temperature change of the specific lens is prevented.

As mentioned above, it is possible to correct the focus shift with high accuracy by controlling the relay lens 25 based on the temperature information of the lens barrel 10 and the temperature information of the atmosphere. According to the lens device 100A, since the member 40 is not required, it is possible to reduce the manufacturing cost.

Figure 8:
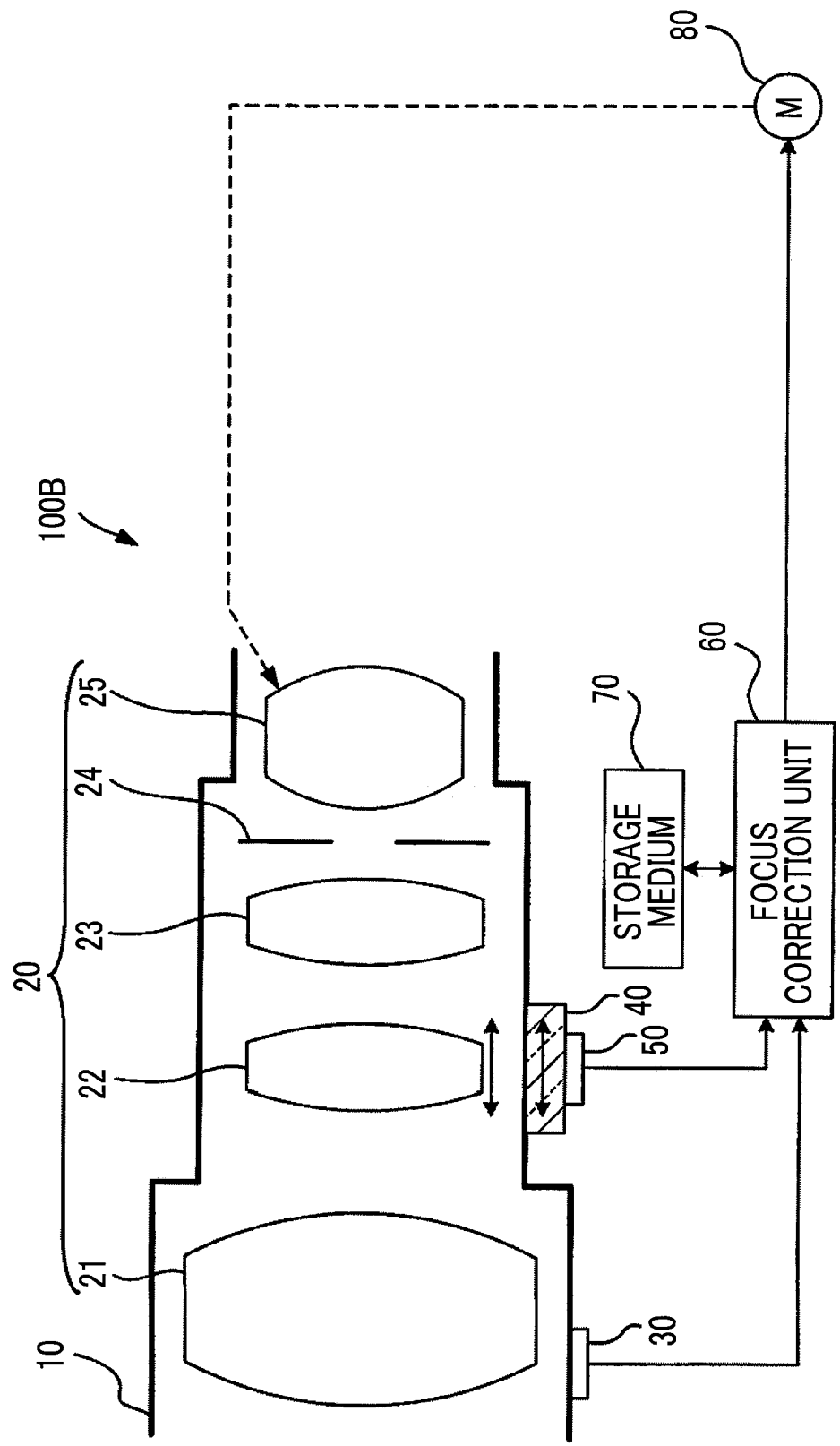
FIG. 8 is a schematic diagram showing a schematic diagram of a lens device 100B which is a modification example of the lens device 100 shown in FIG. 1.

FIG. 8 is a schematic diagram showing a schematic diagram of a lens device 100B which is a modification example of the lens device 100 shown in FIG. 1. In FIG. 8, the same components as those of FIG. 1 will be assigned the same references.

The lens device 100B has the same configuration as the configuration of the lens device 100 except that the member 40 is movable in the optical axis direction of the imaging optical system 20 in synchronization with the movement of the variator lens 22. The member 40 is supported by the lens barrel 10 so as to be movable in the optical axis direction.

In a case where the member 40 provided at the lens device 100B is supported by the lens barrel 10 so as to be movable in the optical axis direction and the variator lens 22 moves in the optical axis direction, the member moves in a direction opposite to the movement direction thereof, and thus, the vibration of the center of gravity of the variator lens 22 is prevented.

As stated above, according to the lens device 100B, it is possible to use the member 40 for preventing the vibration of the center of gravity of a lens group movable in the optical axis direction, which is included in the imaging optical system 20, as the detecting target of the temperature information required to correct the focus shift, and it is possible to reduce the manufacturing cost of the device.

Since the member 40 is supported by the outer peripheral surface of the lens barrel 10 so as to be movable in the optical axis direction, in a case where the specific lens included in the imaging optical system 20 is a lens movable in the optical axis direction, a heat radiation characteristic of the member 40 and a heat radiation characteristic of the specific lens can approximate each other. Accordingly, it is possible to further decrease a difference between the curved line 20a and the curved line 50a shown in FIG. 2, and it is possible to improve the estimation accuracy of the temperature of the specific lens.

It is necessary to set the mass of the member 40 of the lens device 100B to be approximately equal to the mass of the variator lens 22, and the degree of freedom of the selection of the mass is less. Thus, the temperature characteristic of the member 40 may approximate to the temperature characteristic of the specific lens by adjusting the material thereof such that a value obtained by multiplying the specific heat to the mass is approximately equal to an accumulation value of the mass and the specific heat of the specific lens included in the imaging optical system 20. Glass, water, oil, or stone may be used as the material of the member 40 of the lens device 100B.

In the lens device 100B, the member 40 which is the detecting target of the temperature sensor 50 is used as a member having another function. As a modification example, the member 40 of the lens device 100 of FIG. 1 may be supported by the lens barrel 10 so as to be movable in the optical axis direction. According to this configuration, in a case where the specific lens included in the imaging optical system 20 is the lens movable in the optical axis direction, the heat radiation characteristic of the member 40 and the heat radiation characteristic of the specific lens can approximate each other, and it is possible to obtain an effect of improving the estimation accuracy of the temperature of the specific lens.

In each of the lens device 100 and the lens device 100B, it is preferable that a contact area of the member 40 with the lens barrel 10 is approximately equal to a contact area of the specific lens of the imaging optical system 20 with the lens barrel 10. A case where two contact areas are approximately equal to each other includes a case where a difference between these two contact areas is included in a tolerance range in addition to a case where these two contact areas are completely equal to each other. According to this configuration, since the heat radiation characteristic of the member 40 and the heat radiation characteristic of the specific lens can approximate each other, it is possible to improve the estimation accuracy of the temperature of the specific lens.

Although it has been described that the relay lens 25 functions as the correction lens, a lens other than the relay lens 25 included in the imaging optical system 20 may function as the correction lens.

Although it has been described in each of the lens device 100, the lens device 100A, and the lens device 100B that the temperature of the specific lens is estimated based on the temperature information items detected by two temperature sensors having different detecting targets which are provided outside the lens barrel 10, the temperature of the specific lens may be estimated based on temperature information items detected by three temperature sensors or more having different detecting targets which are provided outside the lens barrel 10, and the focus shift may be corrected based on the estimated temperature.

For example, a configuration in which the temperature sensor 50A shown in FIG. 5 is added to the lens device 100 of FIG. 1 is considered. In this configuration, for example, data obtained by associating a first difference value between the temperature information of the lens barrel 10 detected by the temperature sensor 30 and the temperature information of the member 40 detected by the temperature sensor 50, a second difference value between the temperature information of the atmosphere detected by the temperature sensor 50A and the temperature information of the member 40 detected by the temperature sensor 50, and a relative value of the temperature information of the specific lens with respect to any one of the temperature information of the lens barrel 10, the temperature information of the member 40, or the temperature information of the atmosphere is stored as the first data in the storage medium 70.

The focus correction unit 60 estimates the temperature information of the specific lens by calculating the first difference value and the second difference value from the temperature information items respectively input from the temperature sensor 30, the temperature sensor 50, and the temperature sensor 50A, reading out the relative value of the specific lens corresponding to the combination of these two difference values from the first data, and adding the readout relative value to any one of the temperature information of the lens barrel 10, the temperature information of the member 40, or the temperature information of the atmosphere.

According to this configuration, it is possible to further improve the estimation accuracy of the temperature information of the specific lens, and it is possible to correct the focus shift with higher accuracy.

Although it has been described that the lens device and the imaging device are separate devices, the present invention is applicable to an imaging device such as a compact digital camera to which the lens device is integrally provided.

As described above, the following matters are disclosed in this specification.

(1) A lens device comprises an imaging optical system that includes a plurality of lenses, a lens barrel that accommodates the imaging optical system, a first temperature sensor that is provided outside the lens barrel to detect a temperature of the lens barrel, a second temperature sensor that is provided outside the lens barrel to detect a temperature of a target of which a temperature characteristic indicating a temperature change with a time change is different from a temperature characteristic of the lens barrel, and a focus correction unit that corrects a focus shift of the imaging optical system by controlling a correction lens included in the plurality of lenses based on temperature information items respectively detected by the first temperature sensor and the second temperature sensor.

(2) In the lens device according to (1), the second temperature sensor uses a member having a temperature characteristic close to a temperature characteristic of a specific lens included in the plurality of lenses, as a detecting target.

(3) In the lens device according to (2), the member is provided outside the lens barrel.

(4) In the lens device according to (3), a mass and a specific heat of the member are approximately equal to a mass and a specific heat of the specific lens.

(5) In the lens device according to (3) or (4), the member comes in contact with an outer peripheral surface of the lens barrel, and a contact area of the specific lens and the lens barrel and a contact area of the member and the lens barrel are approximately equal to each other.

(6) In the lens device according to (3) or (4), the member is supported by the lens barrel so as to be movable in an optical axis direction of the imaging optical system, and the specific lens is movable in the optical axis direction.

(7) In the lens device according to (6), in a state in which a lens group included in the imaging optical system moves in one direction, the member moves in a direction opposite to the one direction to prevent vibration of a center of gravity of the lens group.

(8) The lens device according to any one of (2) to (7) further comprises a storage medium that stores data obtained by associating a difference value between two temperature information items detected by the first temperature sensor and the second temperature sensor with a relative value of temperature information of the specific lens in a case where any one of the two temperature information items is used as a reference. The focus correction unit calculates the difference value between the two temperature information items, estimates the temperature information of the specific lens based on any one of the difference value, the data, or the two temperature information items, and corrects the focus shift of the imaging optical system based on the estimated temperature information.

(9) In the lens device according to (1), the second temperature sensor uses an atmosphere as a detecting target.

(10) The lens device according to (9) further comprises a storage medium that stores data obtained by associating a difference value between two temperature information items detected by the first temperature sensor and the second temperature sensor with a relative value of temperature information of a specific lens included in the plurality of lenses in a case where any one of the two temperature information items is used as a reference. The focus correction unit calculates the difference value between the two temperature information items, estimates the temperature information of the specific lens based on any one of the difference value, the data, or the two temperature information items, and corrects the focus shift of the imaging optical system based on the estimated temperature information.

(11) An imaging device comprises the lens device according to any one of (1) to (10), and an imaging element that images a subject through the imaging optical system.

(12) A focus shift correction method of a lens device that includes an imaging optical system including a plurality of lenses, and a lens barrel which accommodates the imaging optical system. The method comprises a focus correction step of correcting a focus shift of the imaging optical system by controlling a correction lens included in the plurality of lenses based on temperature information items respectively detected by a first temperature sensor which is provided outside the lens barrel to detect a temperature of the lens barrel and a second temperature sensor which is provided outside the lens barrel to detect a temperature of a target of which a temperature characteristic indicating a temperature change with a time change is different from a temperature characteristic of the lens barrel.

(13) In the focus shift correction method of a lens device according to (12), the second temperature sensor uses a member having a temperature characteristic close to temperature characteristic of a specific lens included in the plurality of lenses, as a detecting target.

(14) In the focus shift correction method of a lens device according to (13), a mass and a specific heat of the member are approximately equal to a mass and a specific heat of the specific lens.

(15) In the focus shift correction method of a lens device according to (13) or (14), the member comes in contact with an outer peripheral surface of the lens barrel, and a contact area of the specific lens and the lens barrel and a contact area of the member and the lens barrel are approximately equal to each other.

(16) In the focus shift correction method of a lens device according to (13) or (14), the member is supported by the lens barrel so as to be movable in an optical axis direction of the imaging optical system, and the specific lens is movable in the optical axis direction.

(17) In the focus shift correction method of a lens device according to (16), in a state in which a lens group included in the imaging optical system moves in one direction, the member moves in a direction opposite to the one direction to prevent vibration of a center of gravity of the lens group.

(18) In the focus shift correction method of a lens device according to any one of (13) to (17), the lens device further comprises a storage medium that stores data obtained by associating a difference value between two temperature information items detected by the first temperature sensor and the second temperature sensor with a relative value of temperature information of the specific lens in a case where any one of the two temperature information items is used as a reference. In the focus correction step, the difference value between the two temperature information items is calculated, the temperature information of the specific lens is estimated based on any one of the difference value, the data, or the two temperature information items, and the focus shift of the imaging optical system is corrected based on the estimated temperature information.

(19) In the focus shift correction method of a lens device according to (12), the second temperature sensor uses an atmosphere as a detecting target.

(20) In the focus shift correction method of a lens device according to (19), the lens device further comprises a storage medium that stores data obtained by associating a difference value between two temperature information items detected by the first temperature sensor and the second temperature sensor with a relative value of temperature information of a specific lens included in the plurality of lenses in a case where any one of the two temperature information items is used as a reference. In the focus correction step, the difference value between the two temperature information items is calculated, the temperature information of the specific lens is estimated based on any one of the difference value, the data, or the two temperature information items, and the focus shift of the imaging optical system is corrected based on the estimated temperature information.

(21) A lens device comprises an imaging optical system that includes a plurality of lenses, a lens barrel that accommodates the imaging optical system, a first temperature sensor that is provided outside the lens barrel to detect a temperature of the lens barrel, a second temperature sensor that is provided outside the lens barrel to detect a temperature of a target of which a temperature characteristic indicating a temperature change with a time change is different from a temperature characteristic of the lens barrel, and a processor that corrects a focus shift of the imaging optical system by controlling a correction lens included in the plurality of lenses based on temperature information items respectively detected by the first temperature sensor and the second temperature sensor.

According to the present invention, it is possible to provide a lens device capable of preventing a focus shift of an imaging optical system due to heat without reducing a degree of freedom of design, and an imaging device comprising the same.

Although the present invention has been described in conjunction with a specific embodiment, the present invention is not limited to the embodiment, and may be variously changed without departing from the technical spirit of the invention disclosed herein.

This application is based on Japanese Patent Application (2016-171618), filed Sep. 2, 2016, the content of which is incorporated herein.

EXPLANATION OF REFERENCES 100, 100A, 100B: lens device
10: lens barrel
20: imaging optical system
21: focusing lens
22: variator lens
23: compensator lens
24: stop
25: relay lens
30, 50, 50A: temperature sensor
40: member
60: focus correction unit
70: storage medium
80: motor
20a: temperature characteristic of specific lens
30a: temperature characteristic of lens barrel 10
50a: temperature characteristic of member 40
50b: temperature characteristic of atmosphere
70a: difference value
70b: relative value

What is claimed is:

1. A lens device comprising:
an imaging optical system that comprises a plurality of lenses;
a lens barrel that accommodates the imaging optical system;
a first temperature sensor that is provided outside the lens barrel to detect a temperature of the lens barrel;
a second temperature sensor that is provided outside the lens barrel to detect a temperature of a detecting target member provided outside the lens barrel and having a temperature characteristic indicating a temperature change with a time change, close to a temperature characteristic of a specific lens included in the plurality of lenses;
a storage medium that stores data obtained by associating a difference value between two temperature information items detected respectively by the first temperature sensor and the second temperature sensor with a relative value of the temperature information of the specific lens in a case where any one of the two temperature information items is used as a reference; and
a focus correction unit that calculates a difference value between the two temperature information items detected respectively by the first temperature sensor and the second temperature sensor, estimates the temperature information of the specific lens based on the difference value and the data stored in the storage medium, and corrects a focus shift of the imaging optical system by controlling a correction lens included in the plurality of lenses based on the estimated temperature information.

2. The lens device according to claim 1,
wherein a mass and a specific heat of the detecting target member are approximately equal to a mass and a specific heat of the specific lens.

3. The lens device according to claim 1,
wherein the detecting target member contacts with an outer peripheral surface of the lens barrel, and
a contact area of the specific lens and the lens barrel and a contact area of the member and the lens barrel are approximately equal to each other.

4. The lens device according to claim 2,
wherein the detecting target member contacts with an outer peripheral surface of the lens barrel, and
a contact area of the specific lens and the lens barrel and a contact area of the member and the lens barrel are approximately equal to each other.

5. The lens device according to claim 1,
wherein the detecting target member is supported by the lens barrel so as to be movable in an optical axis direction of the imaging optical system, and
the specific lens is movable in the optical axis direction.

6. The lens device according to claim 2,
wherein the detecting target member is supported by the lens barrel so as to be movable in an optical axis direction of the imaging optical system, and
the specific lens is movable in the optical axis direction.

7. The lens device according to claim 5,
wherein, in a state in which a lens group included in the imaging optical system moves in one direction, the detecting target member moves in a direction opposite to the one direction to prevent vibration of a center of gravity of the lens group.

8. The lens device according to claim 6,
wherein, in a state in which a lens group included in the imaging optical system moves in one direction, the detecting target member moves in a direction opposite to the one direction to prevent vibration of a center of gravity of the lens group.

9. An imaging device comprising:
the lens device according to claim 1; and
an imaging element that images a subject through the imaging optical system.

10. A focus shift correction method of a lens device that comprises an imaging optical system comprising a plurality of lenses, and a lens barrel which accommodates the imaging optical system, the method comprising:
a temperature difference detection step of detecting a temperature of the lens barrel by a first temperature sensor provided outside the lens barrel, detecting, by a second temperature sensor that is provided outside the lens barrel, a temperature of a detecting target member provided outside the lens barrel and having a temperature characteristic indicating a temperature change with time change close to a temperature characteristic of a specific lens included in the plurality of lenses, and calculating a difference value between two temperature information items respectively detected by the first temperature sensor and the second temperature sensor, and
a focus correction step of estimating the temperature information of the specific lens based on data read out from a storage medium which stores data obtained by associating a difference value between two temperature information items detected respectively by the first temperature sensor and the second temperature sensor with a relative value of the temperature information of the specific lens in a case where any one of the two temperature information items is used as a reference and the difference value between two temperature information items calculated in the temperature difference detection step, and controlling a correction lens included in the plurality of lenses based on the estimated temperature information, thereby correcting a focus shift of the imaging optical system.

11. The focus shift correction method of a lens device according to claim 10,
wherein a mass and a specific heat of the detecting target member are approximately equal to a mass and a specific heat of the specific lens.

12. The focus shift correction method of a lens device according to claim 10,
wherein the detecting target member contacts with an outer peripheral surface of the lens barrel, and
a contact area of the specific lens and the lens barrel and a contact area of the detecting target member and the lens barrel are approximately equal to each other.

13. The focus shift correction method of a lens device according to claim 11,
wherein the detecting target member contacts with an outer peripheral surface of the lens barrel, and
a contact area of the specific lens and the lens barrel and a contact area of the detecting target member and the lens barrel are approximately equal to each other.

14. The focus shift correction method of a lens device according to claim 10,
wherein the detecting target member is supported by the lens barrel so as to be movable in an optical axis direction of the imaging optical system, and
the specific lens is movable in the optical axis direction.

15. The focus shift correction method of a lens device according to claim 11,
wherein the detecting target member is supported by the lens barrel so as to be movable in an optical axis direction of the imaging optical system, and
the specific lens is movable in the optical axis direction.

16. The focus shift correction method of a lens device according to claim 14,
wherein, in a state in which a lens group included in the imaging optical system moves in one direction, the detecting target member moves in a direction opposite to the one direction to prevent vibration of a center of gravity of the lens group.

17. The focus shift correction method of a lens device according to claim 15,
wherein, in a state in which a lens group included in the imaging optical system moves in one direction, the detecting target member moves in a direction opposite to the one direction to prevent vibration of a center of gravity of the lens group.

* * * * *